United States Patent [19]

Jones

[11] Patent Number: 5,048,206
[45] Date of Patent: Sep. 17, 1991

[54] COMBINED SNOW SHOVELING DEVICE AND CART

[76] Inventor: Warren S. Jones, 1011 Woodmere Dr., Indianapolis, Ind. 46260

[21] Appl. No.: 508,975

[22] Filed: Apr. 13, 1990

[51] Int. Cl.⁵ .............................................. E01H 5/02
[52] U.S. Cl. ...................................... 37/265; 37/130; 37/DIG. 3; 280/651; 280/655.1; 414/915
[58] Field of Search ........... 37/264, 265, 130, DIG. 3; 414/685, 697, 415; 280/47.34, 642, 647, 651, 655.1

[56] References Cited

U.S. PATENT DOCUMENTS

| | | | |
|---|---|---|---|
| 206,177 | 11/1966 | Unruh . | |
| 887,974 | 5/1908 | Toy | 37/130 |
| 1,265,394 | 5/1918 | Sears | 37/264 X |
| 1,307,568 | 6/1919 | Wenndorf | 37/130 X |
| 1,473,572 | 11/1923 | Fitzgerald | 37/265 X |
| 2,146,807 | 2/1939 | Ferari | 37/117.5 |
| 2,544,505 | 3/1951 | Kronhaus | 37/130 X |
| 3,017,710 | 1/1962 | Carlson | 37/265 X |
| 3,037,308 | 6/1962 | Miller | 37/130 |
| 3,043,033 | 7/1962 | Ingram et al. | 37/130 |
| 3,121,963 | 2/1964 | Nolan | 37/265 |
| 3,166,339 | 1/1965 | Earley | 37/130 X |
| 4,130,953 | 12/1978 | Bruno | 37/130 |
| 4,224,751 | 9/1980 | Schoemann et al. | 37/265 |
| 4,302,894 | 12/1981 | Emma | 37/130 |
| 4,353,596 | 10/1982 | Gibson | 298/5 X |

FOREIGN PATENT DOCUMENTS

| | | | |
|---|---|---|---|
| 956600 | 10/1974 | Canada | 37/265 |
| 1157626 | 6/1958 | France | 37/130 |
| 849559 | 9/1960 | United Kingdom | 37/264 |

Primary Examiner—Randolph A. Reese
Assistant Examiner—Franco S. DeLiguori
Attorney, Agent, or Firm—Woodard, Emhardt, Naughton Moriarty & McNett

[57] ABSTRACT

A combined snow shoveling device and cart for removing snow from surfaces in one mode of operation and for hauling debris in another mode of operation includes a scoop arranged with a reinforced front edge for scooping snow or other material from a surface and temporarily holding the collected material, a support frame arranged with a handle portion and four wheels which are designed for movement across a surface. A first linkage member is attached to the scoop and to the support frame such that as the support frame is pushed across the surface by means of the four wheels resulting in movement of the scoop across that surface. A second linkage member is attached to the first linkage member and to the scoop and is arranged in order to change the orientation of the scoop such that any collected debris or snow can be elevated and moved to a remote site and then the orientation changed again into a dumping mode so as to empty the scoop of any collected material.

19 Claims, 5 Drawing Sheets

COMBINED SNOW SHOVELING DEVICE AND CART

BACKGROUND OF THE INVENTION

The present invention relates in general to snow shoveling devices or scoops and to carts for hauling material and implements similar to wheelbarrows. More particularly, the present invention relates to a combination of a snow shoveling device and cart which includes several movement capabilities enabled by a unique configuration of handles, linkages and pivotal connections.

The removal of snow from driveways and walkways is normally accomplished in one of two ways. For manual removal, a snow shovel is used and its limitations are well known. The shovel can only hold a limited amount of snow and significant back strain results in moving the snow loaded onto the shovel blade to a remote location away from the driveway or walkway. In many instances the snow must be moved several feet depending upon the length and width of the driveway or walkway.

When one wants to avoid manual removal, a wide range of gasoline powered snow blowers or plows are available. Typically these blowers and plows come in a variety of widths and horsepower ratings which relate to the rate or amount of snow removal. Disadvantages with such gasoline powered devices include their cost and their lack of maneuverability to work in and around tight places. A further point to recognize is that snow shovels, blowers and plows have a limited, singular use, snow removal. These devices are not suitable for other types of general yard work and clean up.

The device of the present invention provides the benefits of a snow shovel from the standpoint of ease of use and maneuverability with enhancements in that much larger loads can be collected and moved in a way that due to the mechanical advantage created does not produce any harmful stress in the back of the user. The device of the present invention can also be used for general yard clean up and hauling. While the conventional devices that are most commonly used, snow shovels and blowers, have been discussed, other devices have been invented for snow removal and general hauling as described in the following patents:

| Patent No. | Patentee | Issue Date |
|---|---|---|
| 4,353,596 | Gibson | 10/12/1982 |
| 4,224,751 | Schoemann et al. | 09/30/1980 |
| 4,130,953 | Bruno | 12/26/1978 |
| 3,121,963 | Nolan | 02/25/1964 |
| 3,043,033 | Ingram et al. | 07/10/1962 |
| 2,544,505 | Kronhaus | 03/06/1951 |
| 2,146,807 | Ferari | 02/14/1939 |
| 1,307,568 | Wenndorf | 06/24/1919 |
| Des. 206,177 | Unruh | 11/08/1966 |

Gibson discloses a breakdown dumping cart which includes a hopper and a support structure which operably supports the hopper and which can be disassembled and stored within the hopper for compact storage and shipping. The support structure includes a pair of side frame members and a number of associated bracing members which cooperate to bracket the hopper on three of its sides, pivotal support members attaching one of the side frame members to the hopper, pivotal over center lever members attaching the other side frame member to the hopper, an axle and wheel assembly attached to the lower section of the side frame members, and a pair of handle members attached to and rearwardly extending from respective ones of the side frame members.

Schoemann discloses a device for snow removal which comprises a frame, a flexible scoop, and means for flexing and relaxing the scoop. The device includes a pair of oppositely disposed handles and a cross brace supporting the handles. Attached to the support brace is a lever arm with a rope connected to it and connected to the front end of the scoop. This arrangement allows the lever arm to be used to manipulate the scoop.

Bruno discloses a snow-removing device which is a scoop or shovel pivotally mounted at one end of a lever arm whose other end has a handle. The lever arm is mounted on a pedestal in such a manner that it can be pivoted in a horizontal plane to raise and lower the scoop by means of the handle, and pivot in a vertical plane to move the scoop to one side or the other. The pedestal is mounted on a sled, with optional wheels, so that with the scoop position in front of the sled, the device can be pushed forward until the scoop is full of snow. The operator can then lever up the load of snow and rotate the scoop to one side or the other whereat a release catch can be actuated to drop the load of snow.

Noland discloses a shoveling device which includes a handled frame, a pair of wheels connected to the frame and a scoop movably carried by the frame and rigidly attached to the handle portion wherein the handle portion is pivotally mounted to the remainder of the frame such that the scoop can be loaded with snow in a lower position and then by pivoting the handle raise the scoop to an elevated position at which point a false bottom may be removed and the snow dumped at the desired dumping site.

Ingram discloses a utility scoop which includes a frame with a handle portion, a pair of wheels for moving the frame forward and a front loading scoop. The attachment of the handle portion to the scoop is by means of a pivotal connection and the pair of wheels are pivotally connected both to the frame and by a second linkage arm to the scoop enabling the scoop to be oriented in a variety of positions.

Kronhaus discloses a self-loading wheelbarrow of what appears to be conventional construction except that the wheelbarrow portion is capable of scooping up cargo from the ground and then elevating it into a hopper portion. The hopper portion is disposed behind the scoop portion and the two are pivotally connected such that by manipulating various levers and linkage arms, the scoop portion can be allowed to dip forward for the scooping action and brought back so as to dump its cargo into the hopper portion and then return to another scooping step. The raising and lowering of the scoop is provided by means of parallel levers which are pivotally connected to the hopper.

Ferari discloses an excavator and loader also referred to as a power shovel which may be used as an attachment for a tractor of the caterpillar type. The bucket is connected to the remainder of the unit by a lever arm and piston arm on each side of the bucket. The lever arm connects to the bucket at a forward point by means of a pivotal connection and the opposite end of the lever arm is secured to the remainder of the excavator and loader. The second connection to the bucket is by means of a hydraulic cylinder which also connects by means of a pivotal connection with the base of the cylinder housing attached to the remainder of the excavator and loader. By means of various hydraulics and linkages, the bucket can be oriented in a forward scooping or pick up mode and then pivoted rearwardly so as to hold or retain the load and then inverted into a dumping mode so as to empty the bucket of the collected contents.

Wenndorf discloses a street-cleaning machine which includes a wheeled cart and a pivotable front scoop. The linkage configuration allows the front scoop to be pushed along the street surface so as to collect debris, trash and garbage and by means of a lever have the collected material brought upwardly and pivoted rearwardly so as to dump the contents of the scoop into the hopper of the cart.

Unruh discloses a combined snow shovel and cart which includes a front scoop or hopper, a wheeled base and a plurality of interconnected linkage arms and handles. In view of the fact that the Unruh reference is a design patent, very little can be learned as to the specifics of the interconnect of the linkages and information as to whatever function they may perform.

While each of the foregoing patented devices may have provided the desired benefits and advantages which are described, it is clear that none disclose the pivotal linkage arrangement of the present invention whereby the scoop of the device can be lifted and moved in an elevated condition and dumped by easy manipulation of the three handles disclosed as part of the present invention.

SUMMARY OF THE INVENTION

A utility device for removing snow from surfaces according to the present invention includes collection means arranged for scooping snow from the surface and temporarily holding the collected snow, a support frame arranged with a handle portion and a plurality of wheels for movement across said surface, a first linkage member attached to the collection means and to the support frame such that movement of the frame across the surface results in movement of the collection means and a second linkage member attached to the first linkage member and to the collection means and arranged to change the orientation of the collection means.

One object of the present invention is to provide an improved combined snow shoveling device and cart.

Related objects and advantages of the present invention will be apparent from the following description.

DESCRIPTION OF THE PREFERRED EMBODIMENT

Figure 1:
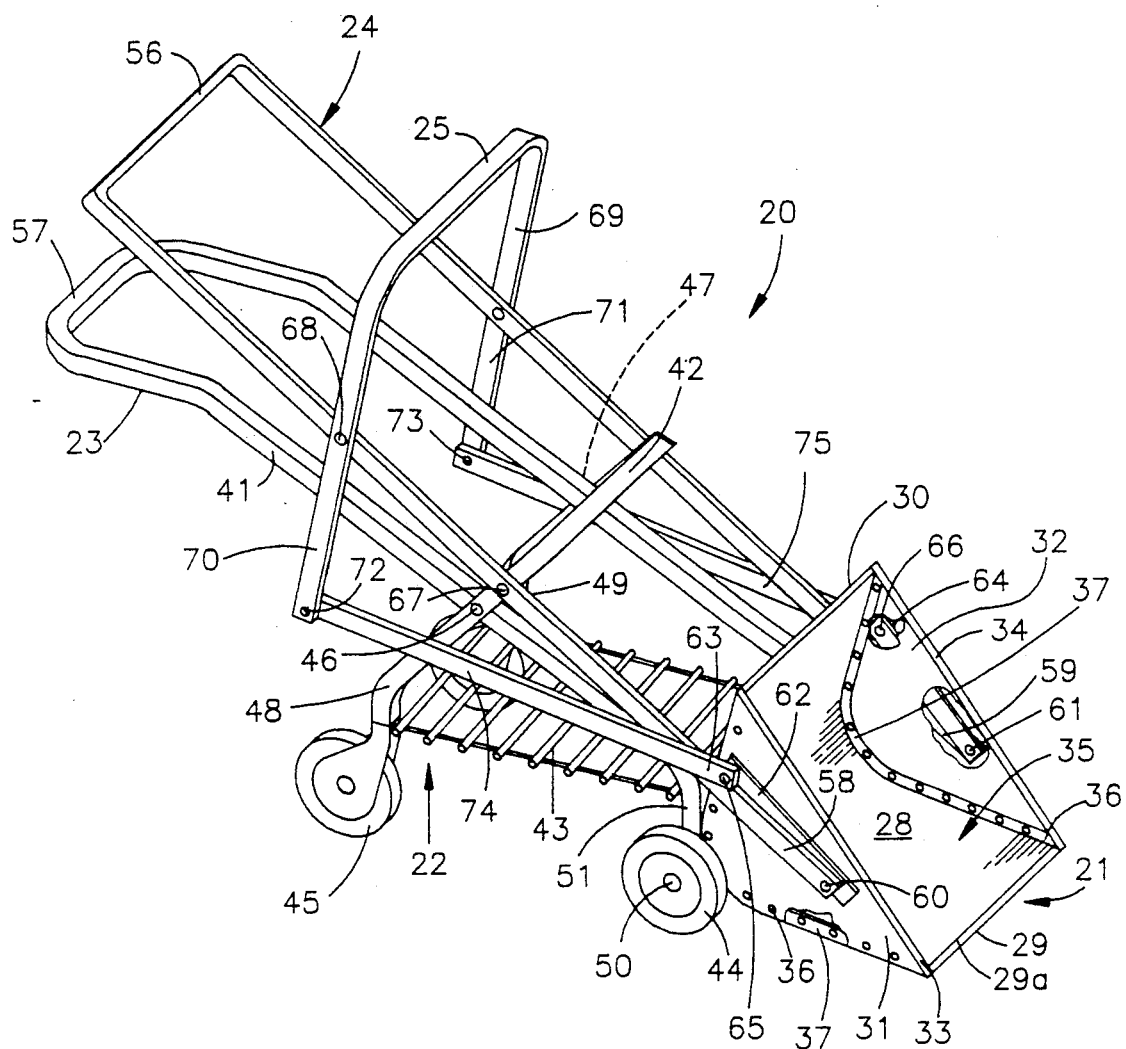
FIG. 1 is a perspective view of a combined snow shoveling device and cart according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a combination snow shoveling and cart device 20 which is oriented as it would be for scooping up snow from a driveway or walkway, for example. Device 20 includes a bucket or scoop 21, a wheeled base 22 and three handles 23, 24 and 25. These five major components are interconnected in a unique and novel way which allows the user, by manipulating the three handles, to scoop up snow and easily move it to a remote dumping site and then dump it by forward rotation of scoop 21. If needed to clear an obstacle, the scoop 21 can be moved into an elevated orientation and dumped from the elevated orientation.

Scoop 21, which is constructed out of a high-strength, durable plastic is arranged with an arcuate floor 28 which includes leading edge 29 and rear edge 30. Edge 29 is additionally strengthened with a rigid metal strip 29a which helps to prevent flexing or warpage of edge 29 which could reduce the scraping and cleaning effectiveness of device 20. Sides 31 an 32 are generally triangular with the exception that the rear apex of each is rounded in order to match the arcuate curvature of the floor 28. The outer edges 33 and 34 of sides 31 and 32, respectively, define, in combination with edges 29 and 30, a generally rectangular opening 35 for scoop 21. By shaping the scoop with the tapering and smoothly curved interior contour, snow can be easily scooped and easily dumped without any corners or edges to impede this process. While the sides 31 and 32 are each preferably separated members from floor 28 and attached thereto by threaded fasteners 36, it is acceptable to configure scoop 21 as a one-piece, molded member. With either construction approach for scoop 21, ribs 37 which are disposed on the interior of scoop 21 provide greater strength and rigidity. In fact, in the molded design, ribs 37 can be included as part of the one-piece construction or the ribs can be provided as separate members and assembled to the molded unit.

Figure 4:
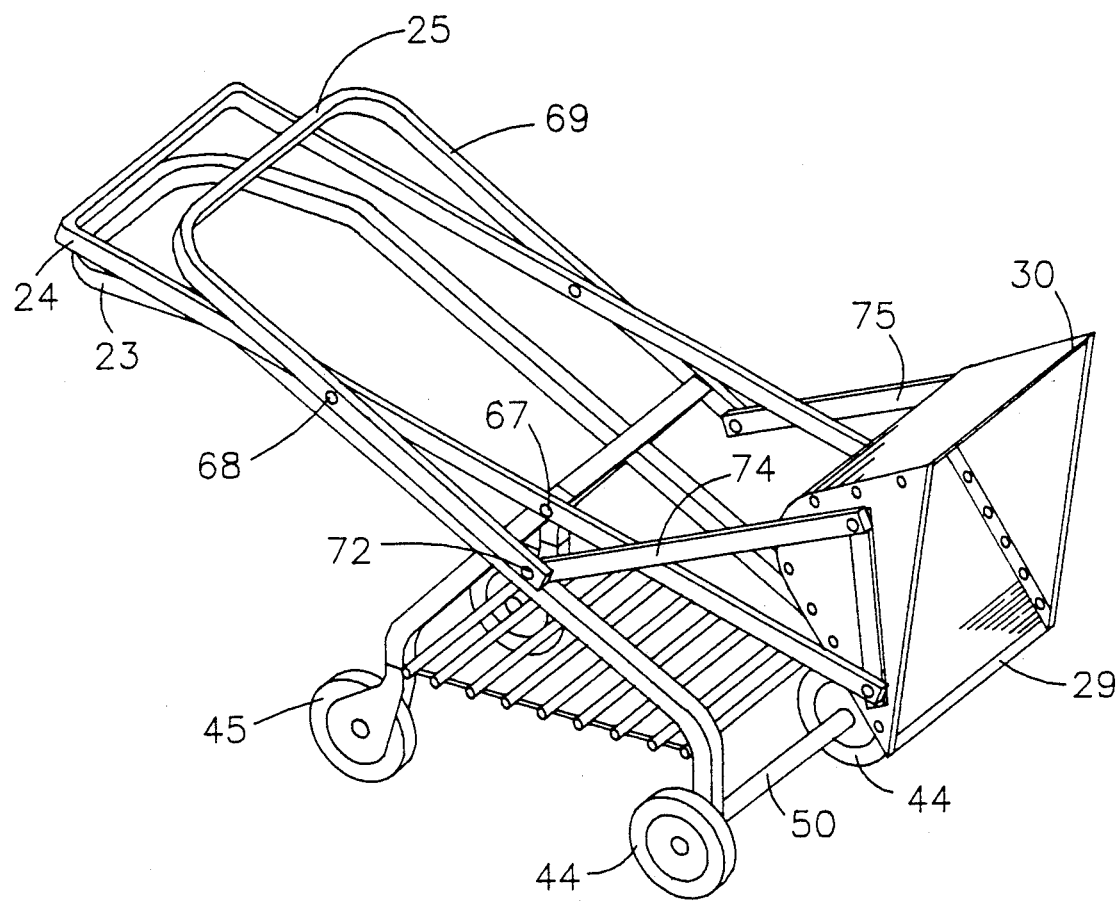
FIG. 4 is a perspective view of the FIG. 1 device with the scoop in an elevated orientation and rotated into a dumping mode.
Figure 5:
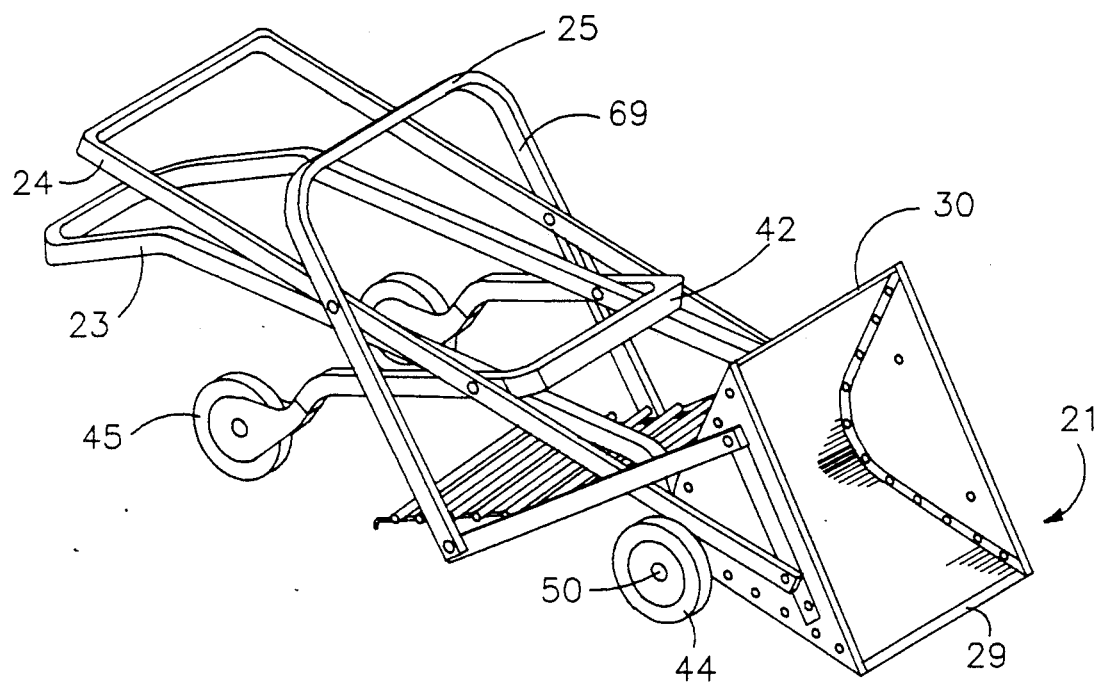
FIG. 5 is a perspective view of the FIG. 1 device as partially disassembled illustrating its knock-down capability.

Wheeled base 22 includes a generally U-shaped first frame member 41, a generally U-shaped second frame member 42, shelf 43, two front wheels 44 (one wheel is hidden from view, see FIG. 4) and two rear wheels 45. The first and second frame members are pivotally connected to each other at two locations 46 and 47 by fasteners such as shoulder bolts. Rear wheels 45 are independent of each other and assembled to the free ends 48 and 49 of the second frame member 42 and arranged with a swivel connection in order to turn or rotate 360° plus, in either direction. Front wheels 44 are joined together by axle 50 (see FIG. 4) which is assembled to the free ends 51 of the first frame member 41. The U-shaped and closed end of member 41 opposite to free ends 51 forms handle 23. Generally rectangular shelf 43 which is attached to free ends 48, 49 and 51 provides strength and bracing to the assembly of the first and second frame members. Although the connection between the frame members is pivotal, there is no relative motion permitted between these members while shelf 43 is in its assembled condition. Removal of shelf 43 enables the wheeled base 22 to collapse (see FIG. 5). This reference to partial disassembly is directed to the fact that instead of a complete removal of shelf 43, it may be disconnected from one pair of free ends and pivoted out of the way so that the two frame members can be collapsed. This ability to collapse enables a knock-down design whereby the scoop is removed so that packaging, shipping and storage of device 20 can be made more efficient and convenient.

By connecting the front wheels 44 with an axle, side-to-side stability of the device is enhanced. The front wheels are assembled in a forward-facing direction and are not movable about the longitudinal axis of the free ends to which the axle is attached. Consequently, if one is operating device 20 on an incline or hillside, it will not turn downhill uncontrollably and can be turned uphill easier than what would be possible if the front wheels could swivel in a manner similar to the rear wheels 45.

While handle 23 is not used as part of the main or primary means to push the scoop 21 forward so as to scoop up snow, it is an important feature when wheeled base 22 encounters some obstacle. In this situation handle 23 is used to control movement of base 22 so as to move up and over the obstacle. Handle 23 also provides a complement to grasping and holding handle 24 in a raised condition whereby the two handles can be conveniently held together to maintain scoop 21 in a raised condition. Since handle 24 is used to control the height of scoop 21 by lever action about the fulcrum at location 67 and maintain scraping contact with edge 29, handle 24 is the primary means used to push the scoop forward. In order to control the pressure of the leading edge 29 against the driveway or walkway to insure a clean and complete pick up of any snow, handle 24 is essential. Pushing or pulling handle 25 helps to keep the scoop properly oriented for scooping efficiency. Consequently, the user may prefer to grasp bar 56 of handle 24 with one hand, handle 25 with the other hand and push forward while pushing edge 29 against the surface to be cleaned. The abdominal area of the user may be used to push against bar 57 of handle 23 (first frame member 41), if necessary, though in the normal course of operation this will not be required.

Handle 24 is pivotally connected to scoop 21 by securing free end 58 to side 31 and free end 59 to side 32. The pivot connections at locations 60 and 61 are by means of fasteners such as rivets or shoulder bolts. Also illustrated is a stiffening bar 62 which may be used in order to provide greater strength and rigidity to side 31. A similar bar is disposed on side 32 in order to maintain the side-to-side symmetry of device 20. Although these two stiffening bars may be an option depending on materials, thickness and other strengthening techniques used for scoop 21, when the stiffening bars are used they are pivotally connected between the sides 31 and 32 and the free ends of handle 24 at one end and the free ends 63 and 64 of handle 25 at the opposite end of bar 62. Pivot connections at 60 and 61 extend through ends 58 and 59 and through one end of each bar 62. Pivot connections at location 65 and 66 extend through ends 63 and 64 and through the opposite end of each bar 62.

As illustrated, handle 24 is pivotally connected on one side at location 67 to second frame member 42 and at location 68 to handle 25. This configuration is duplicated on the opposite side. Also as illustrated handle 25 is a three-part linkage assembly including handle portion 69 and side arms 74 and 75. The U-shaped handle portion 69 which functions as a lever operating about its fulcrum at location 68 extends from side to side and the free ends 70 and 71 of this linkage part are pivotally connected at location 72 and 73 to side arms 74 and 75, respectively. The opposite free end 63 and 64 of side arms 74 and 75, respectively, are pivotally connected at locations 65 and 66 to bars 62 and to sides 31 and 32 as previously described.

Now that the basic construction of combination snow shoveling and cart device 20 has been described, its operation and method of use will be addressed.

When device 20 is used as a snow shovel or plow, it will typically be used in the illustrated orientation of FIG. 1. As the preferred method of use, the user grasps bar 56 of handle 24 with one hand and handle portion 69 of handle 25 with the other hand. The scoop 21 is thereby manipulated to forcefully press leading edge 29 against the surface to be cleaned, such as a driveway or walkway. In this manner, snow is scraped from the driveway or walkway up into scoop 21. After several feet of travel, the actual distance depending on he depth of the snow, the weight of the snow in the scoop is such that the scoop must be emptied.

Figure 2:
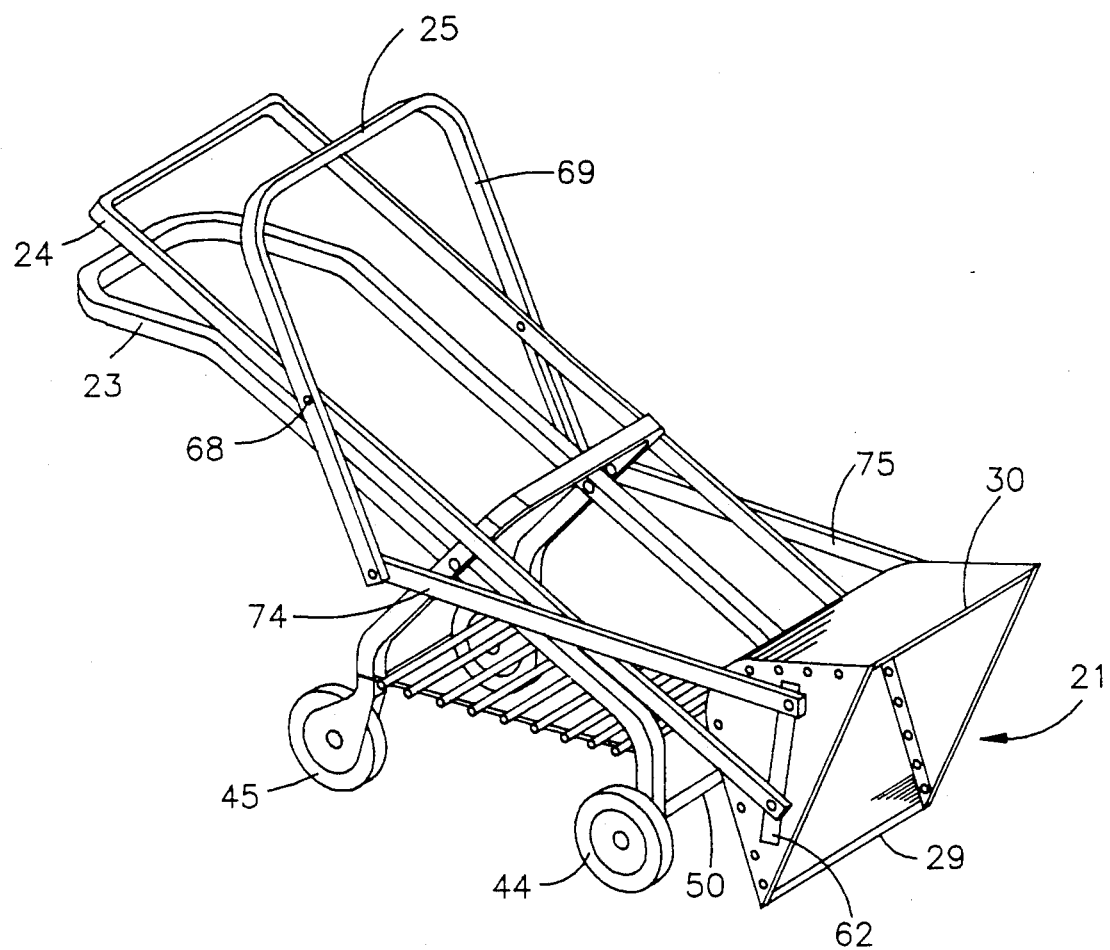
FIG. 2 is a perspective view of the FIG. 1 device oriented in a dumping mode.

If the snow in the scoop is going to be dumped at the edge of the driveway or walkway close to the area being cleaned, then the user simply plows over to the dumping location and pulls back on handle portion 69 (toward the user). This action causes portion 69 to pivot at locations 68 which in turn pushes forward on side arms 74 and 75 which in turn pivots the scoop forward bringing edge 30 up and over edge 29 as is illustrated in FIG. 2.

Figure 3:
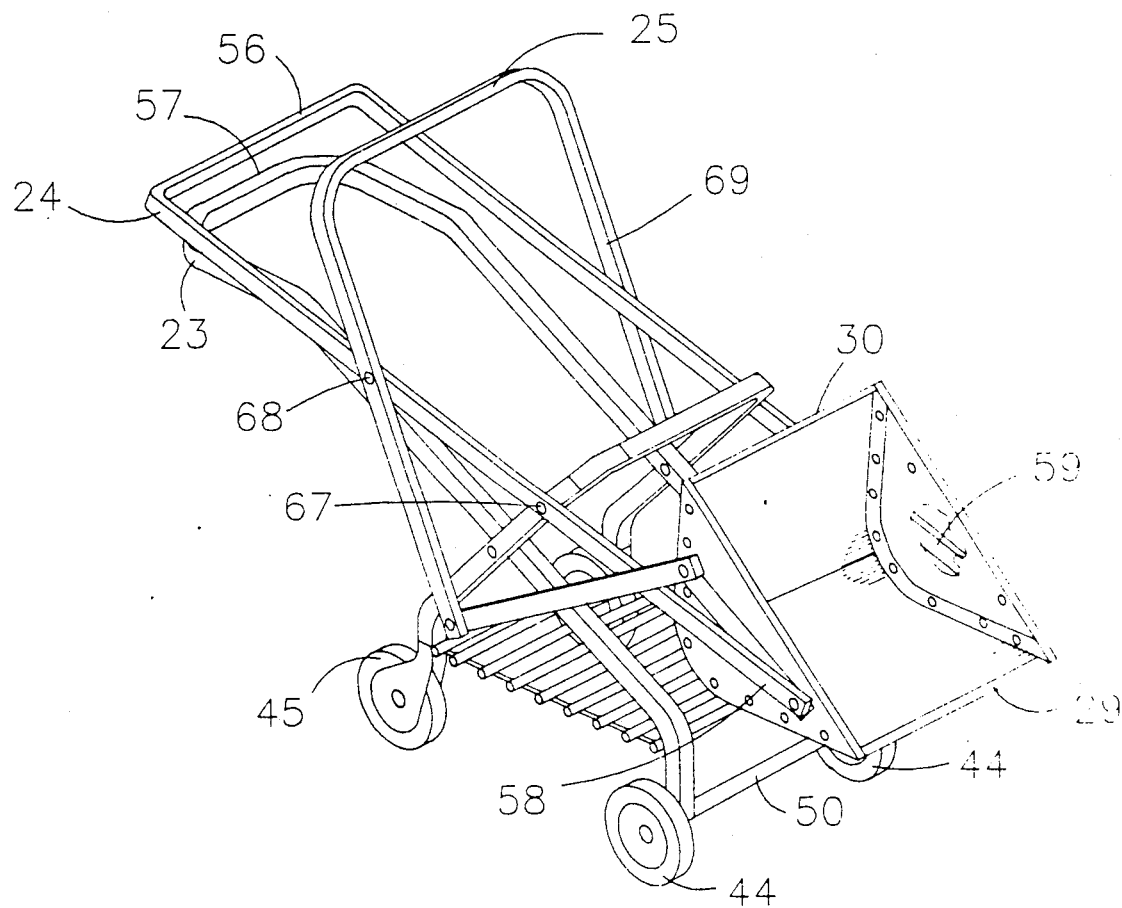
FIG. 3 is a perspective view of the FIG. 1 device with the scoop in an elevated orientation.

If the load of snow in scoop 21 cannot be dumped at the edge of the driveway or walkway and needs to be moved to some remote site, the scoop can be elevated as illustrated in FIG. 3. As should be understood, as the selected areas are cleared of snow, the user can simply plow and scoop to the edge of the area and dump the snow even if the scoop is not full. This is the method of use based on the illustrations of FIGS. 1 and 2. However, if the area to be cleared is large and the scoop fills before reaching the edge of the area for dumping, the scooping action must be stopped and the collected snow moved to the dumping location. The carrying mode for the collected snow under these circumstances is preferably that illustrated in FIG. 3. This orientation is also used for a partially filled scoop when the snow is to be moved to a remote site for dumping.

The orientation of FIG. 3 is achieved by pulling back on bar 56 of handle 24 and in effect bringing bars 56 and 57 together as is illustrated. Handle 24 pivots at location 67, and as bar 56 is drawn back (toward the user), the free ends 58 and 59 are elevated. This elevating motion both pivots the scoop bringing edge 29 up and lifts the entire scoop.

With device 20 in the FIG. 3 orientation, whatever snow was in the scoop 21 may be moved to any location for dumping. The elevated nature of the scoop allows it to clear and the snow dumped beyond obstacles such as brick, stone or timbers used for borders, edges or curbs which are typically used in landscaping. When the user reaches the dumping site with scoop 21 in the elevated FIG. 3 orientation, handle portion 69 is pulled back toward the user. This action brings bars 56 and 57 and handle portion 69 together (see FIG. 4). The pivoting action of the scoop is the same as that described with regard to FIG. 2. As handle portion 69 is pulled back it pivots at location 68 which pivotally pushes side arms 74 and 75 forward thereby bringing edge 30 up and over edge 29.

While the basic operation of device 20 has been illustrated and described, there are other features and capabilities of the device which need to be mentioned. For example, device 20 is not limited to use as a snow shovel and plow. Device 20 may be used as a hand cart or wheelbarrow. By establishing the FIG. 1 orientation, the scoop may be loaded with any type of trash, debris, leaves, etc. and moved from one location to another. The scoop may also be used to move mulch or fertilizer to a desired location and then dump it allowing the device to be returned to the pickup point for another load. Garden supplies and implements may be placed in scoop 21 and moved to a remote location. Shelf 43 is an accessory which not only provides stability and strength to the frame and wheel base, it also can be used to carry articles such as hand tools, clothing, gloves, drinking water, radio or bags or seed or fertilizer as well as empty trash bags. In snow, the shelf 43 can be used for carrying a bag of salt so that it will be accessible to the user as areas of the driveway or walkway are cleared of snow.

Device 20 can also be used for clearing snow from dead ends and corners due to its design and maneuverability. While described as a snow shovel or plow, the FIG. 2 orientation of device 20 is significant because in this orientation edge 29 can be forced tightly against the surface to be cleared. Since the angle of the scoop floor 29 is up and away, edge 29 can be used as a scrape to drag or pull snow out of corners and dead ends. Device 10 can also be used conventionally in the orientation of FIG. 1 to scoop up snow and then move it for dumping. At any time snow is to be scraped back from an edge or corner. the empty scoop is oriented as in FIG. 2 by pulling back on handle 25. Holding handles 24 and 25 together the user then pulls back on handle 23 without releasing the contact force of edge 29 on the surface.

A further option of device 20 is to simply use it as a snow plow without any dumping. By simply pushing the device across the driveway or walkway surface snow will collect in the scoop and even though the scoop may be filled, continued movement will actually plow the snow off of the driveway or walkway pushing it out to the sides if there is no room in the scoop to collect any more snow. Related to this particular use is the option of designing the scoop as a flatter blade and using it more as a plow so that there is less snow collected and less weight to move. It should be understood that the linkage design allows a blade to be set at different orientations for the desired plowing action which the user may wish.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A manually powered utility device for removing snow from a surface, said device comprising:
   collection means designed and arranged for manually variable and selectable orientation relative to said surface and arranged for scooping snow from a surface and temporarily holding the collected snow;
   a support frame arranged with a plurality of wheels disposed across said surface;
   a manually operable first lever pivotally attached at a first location to said collection means and at a second location to said support frame such that movement of said frame across said surface results in movement of said collection means, said second location of attachment to said support frame providing a fulcrum for said first lever; and
   a second lever manually operable independently of said first lever and pivotally attached to said first lever, said second lever being pivotally attached to said collection means and arranged to selectively change the orientation of said collection means relative to said surface by manually controlled rotation of said collection means to anyone of a plurality of different orientations relative to said surface about an axis of rotation passing through said first location.

2. The utility device of claim 1 wherein said support frame includes two U-shaped crossed linkage arms and four wheels, two of said wheels being attached to one linkage arm and the other two of said wheels being attached to the other linkage arm.

3. The utility device of claim 2 wherein each of said two crossed linkage arms has a pair of oppositely disposed free ends and wherein said support frame includes a shelf disposed between said four free ends.

4. The utility device of claim 3 wherein said first lever is a generally U-shaped member.

5. The utility device of claim 4 wherein said second lever is a generally U-shaped member arranged with two support arms and a handle portion, each arm being pivotally connected at a first end to said handle portion and at an opposite end to said collection means.

6. The utility device of claim 1 wherein said first lever is a generally U-shaped member.

7. The utility device of claim 6 wherein said second lever is a generally U-shaped member arranged with two support arms and a handle portion, each arm being pivotally connected at a first end to said handle portion and at an opposite end to said collection means.

8. A manually powered utility device for transporting material over ground, said device comprising:
   collection means designed and arranged for manually variable and selectable orientation relative to said ground and arranged for receiving and retaining material to be transported;
   a support frame arranged with a plurality of wheels;
   a manually operable first lever pivotally attached at a first location to said collection means and at a second location to said support frame such that movement of said support frame results in movement of said collection means, said second location of attachment to said support frame providing a fulcrum for said first lever; and
   a second lever manually operable independently of said first lever and pivotally attached to said first lever, said second lever being pivotally attached to said collection means and arranged to selectively change the orientation of said collection means relative to said ground by manually controlled rotation of said collection means to anyone of a plurality of different orientations relative to said ground about an axis of rotation passing through said first location.

9. The utility device of claim 8 wherein said support frame includes two U-shaped crossed linkage arms and four wheels, two of said wheels being attached to one linkage arm and the other two of said wheels being attached to the other linkage arm.

10. The utility device of claim 9 wherein each of said two crossed linkage arms has a pair of oppositely disposed free ends and wherein said support frame includes a shelf disposed between said four free ends.

11. The utility device of claim 10 wherein said first lever is a generally U-shaped member.

12. The utility device of claim 11 wherein said second lever is a generally U-shaped member arranged with two support arms and a handle portion, each arm being pivotally connected at a first end to said handle portion and at an opposite end to said collection means.

13. The utility device of claim 8 wherein said first lever is a generally U-shaped member.

14. The utility device of claim 13 wherein said second lever is a generally U-shaped member arranged with two support arms and a handle portion, each arm being pivotally connected at a first end to said handle portion and at an opposite end to said collection means.

15. A manually powered utility device for removing snow from a surface, said device comprising:
   snow plow means designed and arranged for manually variable and selectable orientation relative to said surface and arranged for scooping snow from a surface and temporarily holding the collected snow;
   a support frame arranged with a plurality of wheels disposed across said surface;
   a manually operable first lever pivotally attached at a first location to said snow plow means and at a second location to said support frame such that movement of said frame across said surface results in movement of said snow plow means, said second location of attachment to said support frame providing a fulcrum for said first lever; and
   a second lever manually operable independently of said first lever and pivotally attached to said first lever, said second lever being pivotally attached to said snow plow means and arranged to selectively change the orientation of said snow plow means by manually controlled rotation of said collection means relative to said surface to anyone of a plurality of different orientations relative to said surface about an axis or rotation passing through said first location.

16. The utility device of claim 15 wherein said first lever is a generally U-shaped member.

17. The utility device of claim 16 wherein said second lever is a generally U-shaped member arranged with two support arms and a handle portion, each arm being pivotally connected at a first end to said handle portion and at an opposite end to said collection means.

18. A utility device for removing debris from a surface comprises:
   collection means designed and arranged for manually variable and selectable orientation relative to said surface and arranged for collecting debris from a surface and temporarily holding the collected debris;
   a support frame arranged with a plurality of wheels disposed across said surface;
   a manually operable first lever pivotally attached at a first location to said collection means and at a second location to said support frame such that movement of said frame across said surface results in movement of said collection means; and
   a second lever manually operable independently of said first lever and pivotally attached to said first lever, said second lever be pivotally attached to said collection means and arranged to selectively change the orientation of said collection means relative to said surface by manually controlled rotation of said collection means to anyone of a plurality of different orientations relative to said surface about an axis of rotation passing through said first location.

19. A utility device for removing debris from a surface comprises:
   collection means designed and arranged for manually variable and selectable orientation relative to said surface and arranged for collecting debris from a surface and temporarily holding the collected debris;
   a support frame arranged with a plurality of wheels disposed across said surface;
   a manually operable first lever pivotally attached at a first location to said collection means and at a second location to said support frame such that movement of said frame across said surface results in movement of said collection means, said second location of attachment to said support frame providing a fulcrum for said first lever; and
   a second lever manually operable independent of said first lever, pivotally attached to said first lever, said second lever being pivotally attached to said collection means and arranged to selectively change the orientation of said collection means relative to said surface by manually controlled rotation of said collection means to anyone of a plurality of different orientations.

* * * * *

UNITED STATES PATENT AND TRADEMARK OFFICE
CERTIFICATE OF CORRECTION

PATENT NO. : 5,048,206
DATED : September 17, 1991
INVENTOR(S) : Warren S. Jones It is certified that error appears in the above-identified patent and that said Letters Patent is hereby corrected as shown below:

In column 7, line 28, please change first instance of "29' to --28--.
In column 7, line 30, please change "10" to --20--.
In column 10, line 19, please change "be" to --being--.
In column 10, line 44, please change "first lever, pivotally" to read --first lever and pivotally--.

Signed and Sealed this

Twenty-second Day of December, 1992

Attest:

DOUGLAS B. COMER

Attesting Officer

Acting Commissioner of Patents and Trademarks